(12) United States Patent
Van Caekenberghe et al.

(10) Patent No.: US 7,994,969 B2
(45) Date of Patent: Aug. 9, 2011

(54) OFDM FREQUENCY SCANNING RADAR

(75) Inventors: Koen Van Caekenberghe, Meise (BE); Karl Brakora, Dexter, MI (US); Kamal Sarabandi, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 11 days.

(21) Appl. No.: 12/233,818

(22) Filed: Sep. 19, 2008

(65) Prior Publication Data

US 2009/0079620 A1 Mar. 26, 2009

Related U.S. Application Data

(60) Provisional application No. 60/974,144, filed on Sep. 21, 2007.

(51) Int. Cl.
*G01S 13/00* (2006.01)
(52) U.S. Cl. ........ 342/200; 342/107; 342/113; 342/146; 342/147
(58) Field of Classification Search .................... 342/200
See application file for complete search history.

(56) References Cited

U.S. PATENT DOCUMENTS

| | | | | |
|---|---|---|---|---|
| 3,419,870 A * | 12/1968 | Wong | ........................... | 343/768 |
| 3,545,841 A * | 12/1970 | Re et al. | ........................ | 359/305 |
| 4,742,355 A * | 5/1988 | Wolfson et al. | ............... | 342/375 |
| 4,841,308 A * | 6/1989 | Terakawa et al. | ............. | 343/771 |
| 4,868,574 A * | 9/1989 | Raab | ............................. | 342/81 |
| 4,996,532 A * | 2/1991 | Kirimoto et al. | ................ | 342/81 |
| 6,029,116 A * | 2/2000 | Wright et al. | .................. | 702/32 |
| 6,972,727 B1 * | 12/2005 | West et al. | .................... | 343/771 |
| 7,019,682 B1 * | 3/2006 | Louberg et al. | ................. | 342/22 |
| 7,130,200 B1 * | 10/2006 | Liu | ............................... | 361/801 |
| 7,130,361 B1 * | 10/2006 | Enderlein et al. | ............. | 375/324 |
| 2004/0081073 A1 * | 4/2004 | Walton et al. | ................. | 370/204 |
| 2004/0183620 A1 * | 9/2004 | Scorer | ............................. | 333/26 |

(Continued)

FOREIGN PATENT DOCUMENTS

FR 2893203 A1 * 5/2007

OTHER PUBLICATIONS

ECMA International, "High Rate Ultra Wideband PHY and MAC Standard", Standard ECMA-368, 3rd Edition, Dec. 2008.
ECMA International, "MAC-PHY Interface for ECMA-368", Standard ECMA-369, 3rd Edition, Dec. 2008.

(Continued)

*Primary Examiner* — Thomas H Tarcza
*Assistant Examiner* — Timothy A Brainard
(74) *Attorney, Agent, or Firm* — Harness, Dickey & Pierce, P.L.C.

(57) ABSTRACT

A radar system is disclosed, which comprises an orthogonal frequency division multiplexing (OFDM) modem and a frequency scanning antenna. In transmit, the OFDM modem modulates radar waveforms and the frequency scanning antenna radiates the OFDM modulated radio frequency (RF) energy. In receive mode, the frequency scanning antenna captures the echoes and the OFDM modem demodulates the echoes. Directionality of the frequency scanning antenna is dependent upon RF carrier frequency. In other features, the radar system further comprises a transmit/receive (T/R) module that up-converts and amplifies the OFDM modulation, and outputs the amplified signal to the frequency scanning antenna. The T/R module amplifies and down-converts a received RF echo from the frequency scanning antenna and outputs the down-converted echo to the OFDM modem. A plurality of scanning angles are measured simultaneously.

20 Claims, 11 Drawing Sheets

U.S. PATENT DOCUMENTS

| | | | |
|---|---|---|---|
| 2005/0062640 A1* | 3/2005 | Edwards et al. | 342/42 |
| 2005/0110678 A1* | 5/2005 | Doi | 342/372 |
| 2005/0201268 A1* | 9/2005 | Aoki et al. | 370/208 |
| 2005/0259568 A1* | 11/2005 | Yeh et al. | 370/208 |
| 2006/0055587 A1* | 3/2006 | Mitsumoto | 342/70 |
| 2007/0274203 A1* | 11/2007 | Kimura et al. | 370/208 |
| 2007/0285314 A1* | 12/2007 | Mortazawi et al. | 342/375 |
| 2007/0285322 A1* | 12/2007 | Nyshadham et al. | 343/703 |
| 2009/0122840 A1* | 5/2009 | Quagliaro | 375/146 |

OTHER PUBLICATIONS

Solbach, Klaus, Below-Resonant-Length Slot Radiators for Traveling-Wave-Array Antennas, IEEE Antennas and Propagation Magazine, vol. 38, No. 1, Feb. 1996.

Van Caekenberghe, Koen, et al., "A 94 GHz OFDM Frequency Scanning Radar for Autonomous Landing Guidance", Radiation Laboratory, Dept. of Electrical Engineering and Computer Science.

* cited by examiner

OFDM FREQUENCY SCANNING RADAR

CROSS-REFERENCE TO RELATED APPLICATIONS

This application claims the benefit of U.S. Provisional Application No. 60/974,144, filed on Sep. 21, 2007. The entire disclosure of the above application is incorporated herein by reference.

FIELD

The present disclosure relates to radar systems and, more particularly, relates to a phased array comprising an orthogonal frequency division multiplexing (OFDM) modem and a frequency scanning antenna to provide high-resolution millimeter-wave imaging through low-cost and low-profile angle detection.

BACKGROUND AND SUMMARY

This section provides background information related to the present disclosure which is not necessarily prior art. This section further provides a general summary of the disclosure, and is not a comprehensive disclosure of its full scope or all of its features.

Radio detection and ranging (radar) is used to sense angle, range and velocity of (moving) scatterers in the environment. Radar sensor capabilities of merit include maximum range and solid angle, as well as angular, range and velocity resolution. Range and velocity are typically detected through pulse delay ranging and the Doppler effect (pulse-Doppler), or through the frequency modulated continuous wave (FMCW) technique and range differentiation. Angle is detected by scanning the volume with a highly directive beam. Scanning is done mechanically, by rotating an antenna, or electronically, by steering the beam of an array. Angular resolution typically depends on the beamwidth of the antenna or the array, but techniques such as monopulse significantly increase the angular resolution of pulse-Doppler radars beyond real beamwidth. The range resolution is limited by the instantaneous signal bandwidth of the radar sensor in both pulse-Doppler and FMCW radars.

According to principles of the present teachings, a radar system comprising an orthogonal frequency division multiplexing (OFDM) modem and a frequency scanning antenna is provided. The OFDM modem produces an OFDM modulation. The frequency scanning antenna then radiates the OFDM modulated radio frequency (RF) energy. Directionality of the frequency scanning radar is dependent upon the sub-band carrier frequency of the OFDM modulation.

In some embodiments, the radar system further comprises a transmit/receive (T/R) module that up-converts and amplifies the OFDM modulation, and outputs the amplified signal to the frequency scanning antenna. In some embodiments, the T/R module amplifies and down-converts a received RF signal from the frequency scanning antenna and outputs the down-converted signal to the OFDM modem. A plurality of scanning angles can be measured simultaneously.

In some embodiments, the frequency scanning antenna comprises a slotted waveguide, which is traveling-wave fed. In some embodiments, the slotted waveguide comprises at least one of a helical and a serpentine (also called sinuous or meandered) waveguide feed. Slots of the slotted waveguide can be milled from a broad wall or the narrow wall of the slotted waveguide. Slots of the slotted waveguide can also be linearly aligned or offset. In some embodiments, slots of the slotted waveguide are tapered in width for uniform amplitude excitation of the slotted waveguide.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 1:
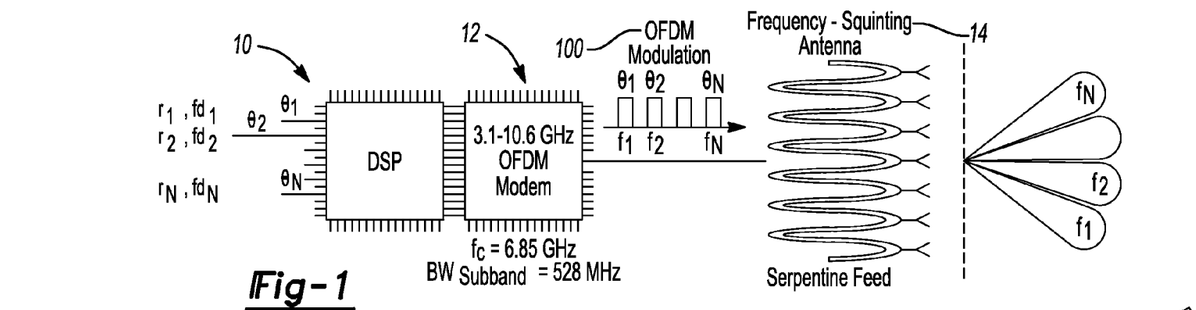
FIG. 1 illustrates a schematic block diagram of a radar system according to the principles of the present teachings having an OFDM modem used in conjunction with a frequency scanning antenna to provide high-resolution millimeter-wave imaging through low-cost and low-profile angle detection.
Figure 2:
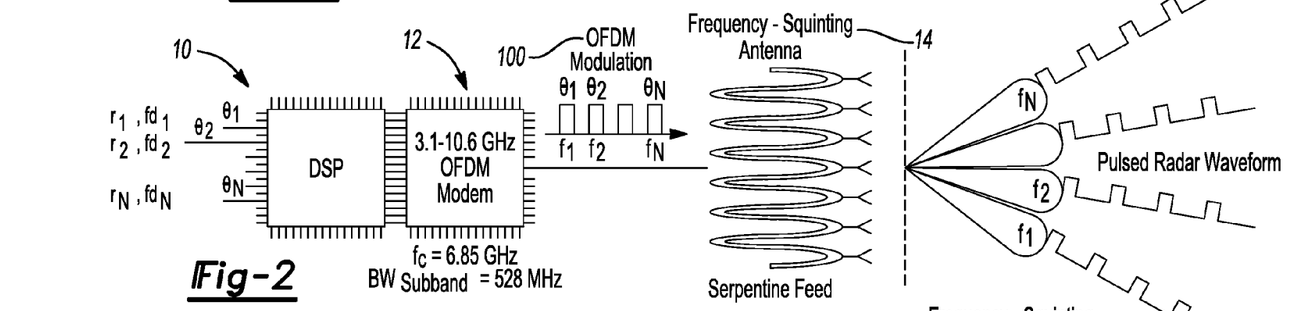
FIG. 2 illustrates a schematic block diagram of an embodiment of the radar system of FIG. 1 wherein each sub-band of the OFDM modulation carries a pulsed radar waveform.
Figure 5:
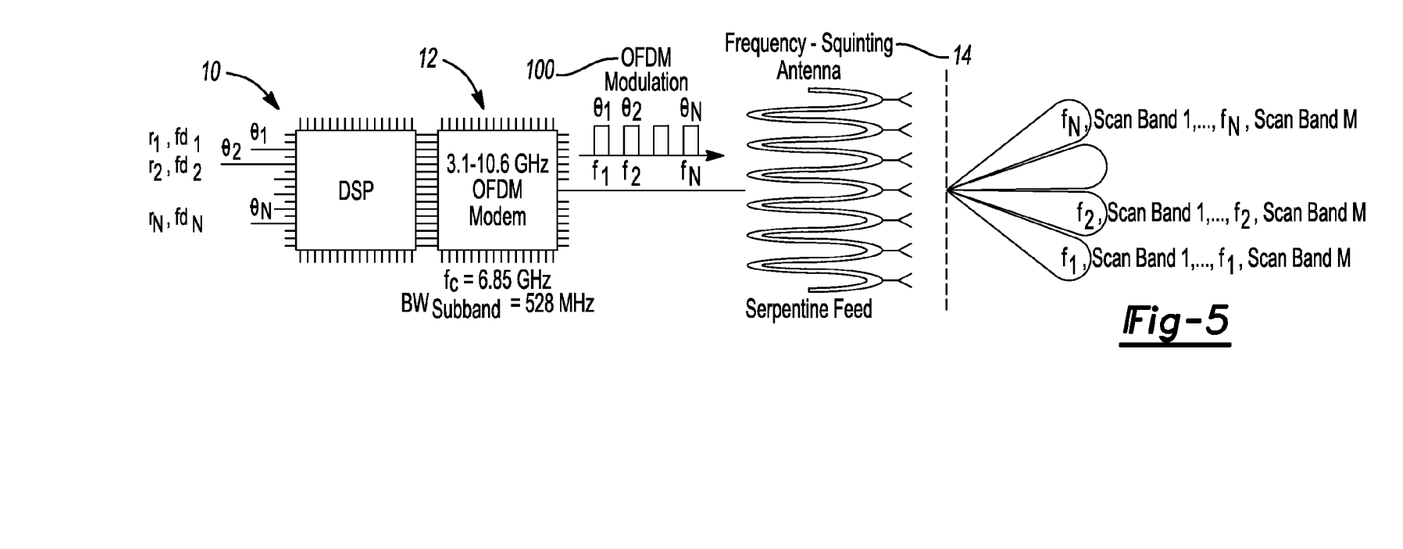
FIG. 5 illustrates a schematic block diagram of an embodiment of the radar system of FIG. 1 wherein a plurality of frequency-scan bands of said frequency scanning antenna is used to cover space with a plurality of OFDM waveforms, henceforth referred to as colors.

According to the principles of the present teachings, a radar system 10 is provided having an orthogonal frequency division multiplexing (OFDM) modem 12 and a frequency scanning antenna 14 operably coupled to OFDM modem 12, as illustrated in FIG. 1. The OFDM modem 12 outputs an OFDM modulation 100. The frequency scanning antenna 14 radiates radio frequency (RF) energy based on the OFDM modulation. Directionality of the frequency scanning radar 14 is dependent upon the sub-band carrier frequency of the OFDM modulation 100. It should be appreciated that in some embodiments, as illustrated in FIG. 2, the OFDM subband 100 can carry a pulse-Doppler radar waveform for detection of target range and velocity. It should also be appreciated that in some embodiments, as illustrated in FIG. 5, the radar system can comprise a plurality of frequency-scan bands of from frequency scanning antenna 14 that is used to cover space with a plurality of OFDM waveforms, henceforth referred to as colors.

Figure 3:
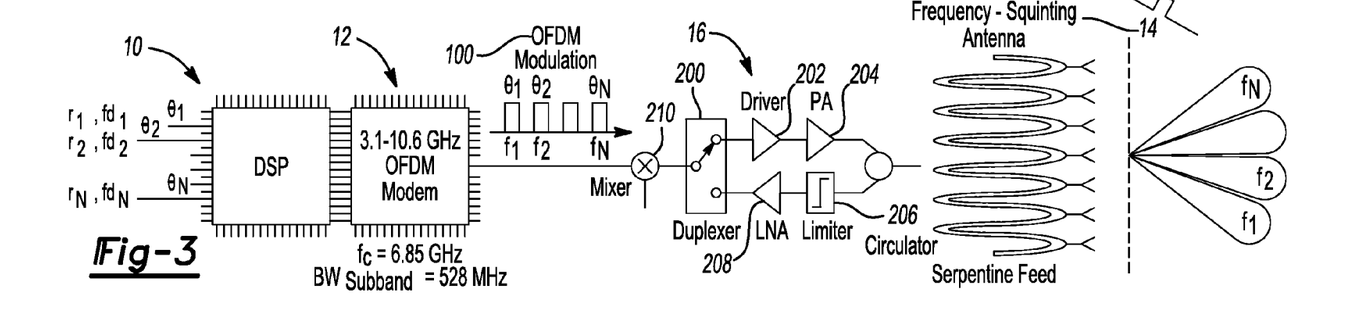
FIG. 3 illustrates a schematic block diagram of an embodiment of the radar system of FIG. 1 further comprising a transmit/receive (T/R) module disposed between the OFDM modem and the frequency scanning antenna.

In some embodiments as illustrated in FIG. 3, the radar system 10 further comprises a transmit/receive (T/R) module 16 that up-converts and amplifies the OFDM modulation 100, and outputs the amplified signal 102 to the frequency scanning antenna 14. In some embodiments, the T/R module 16 further amplifies and down-converts a received RF signal from the frequency scanning antenna and outputs the down-converted signal to the OFDM modem 12. A plurality of scanning angles are measured simultaneously.

Figure 7:
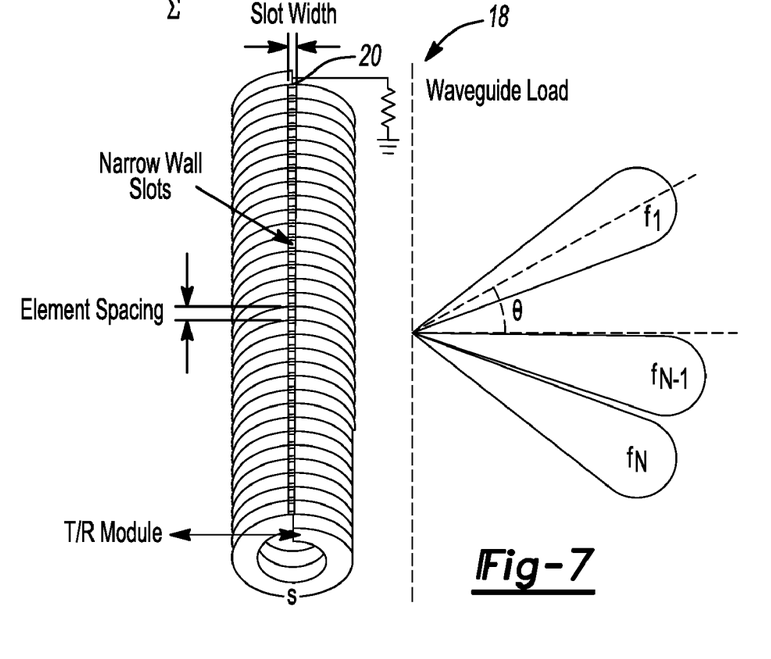
FIG. 7 illustrates a slotted waveguide according to principles of the present teachings.
Figure 8A:
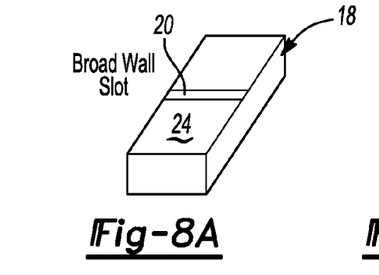
FIG. 8A illustrates a slotted waveguide having slots formed in the broad wall thereof.
Figure 8B:
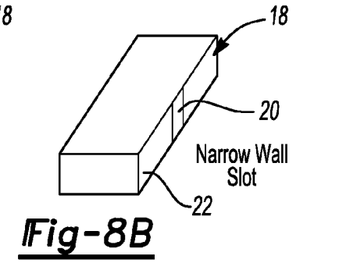
FIG. 8B illustrates a slotted waveguide having slots formed in the narrow wall thereof.
Figure 9A:
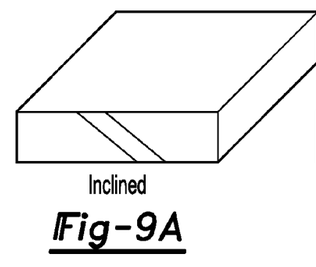
FIG. 9A illustrates a slotted waveguide having slots formed therein in an inclined orientation.
Figure 9B:
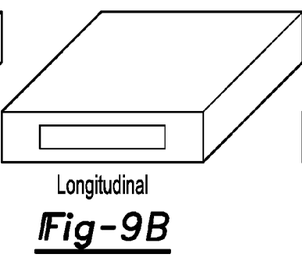
FIG. 9B illustrates a slotted waveguide having slots formed therein in a longitudinal orientation.
Figure 9C:
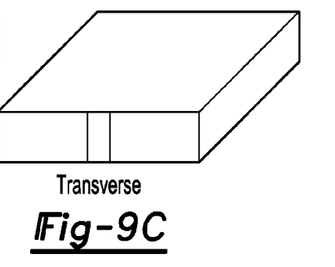
FIG. 9C illustrates a slotted waveguide having slots formed therein in a transverse orientation.
Figure 10A:
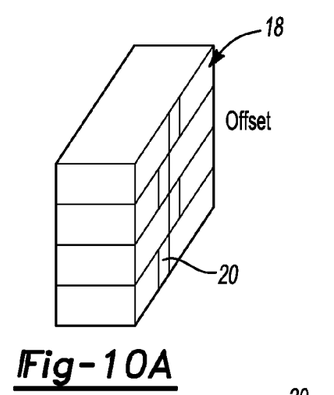
FIG. 10A illustrates slot radiators of a slotted waveguide being offset relative to each other.
Figure 10B:
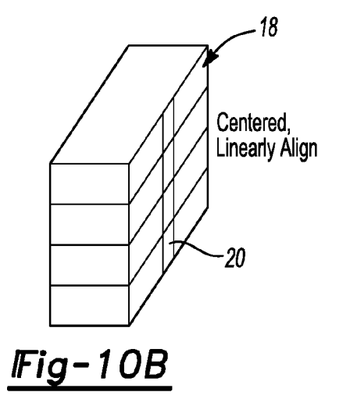
FIG. 10B illustrates slot radiators of a slotted waveguide being linearly aligned relative to each other.
Figure 11:
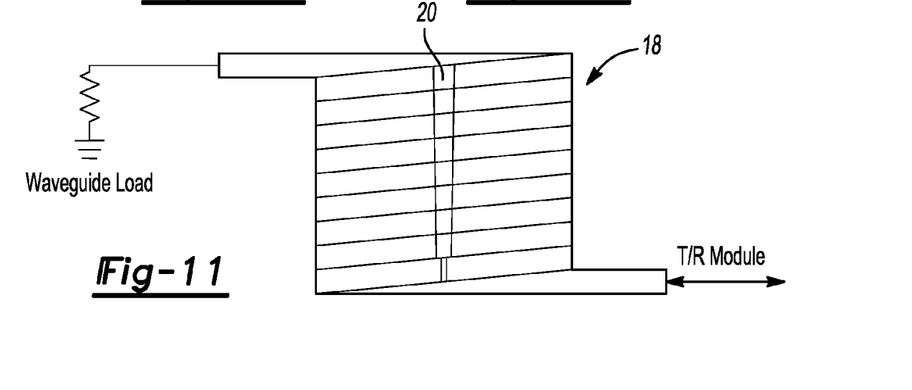
FIG. 11 illustrates a slotted waveguide in which the dimensions of each of the slots of the slotted waveguide are varied to control the array weights of each of the slot radiator elements.
Figure 12A:
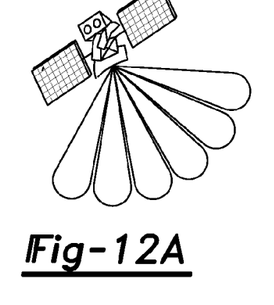
FIGS. 12A-E illustrate the radar system of the present application being used in space-borne, automotive, naval, ground-based and airborne applications, respectively.
Figure 12B:
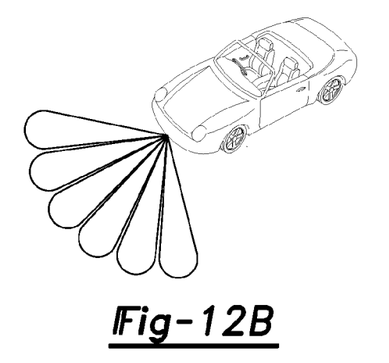
Figure 12C:
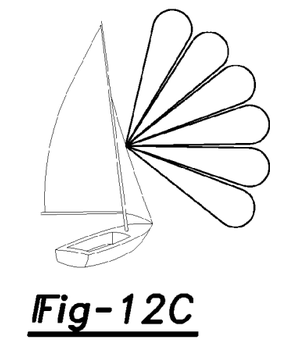
Figure 12D:
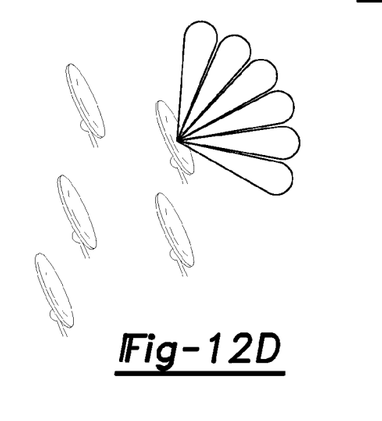
Figure 12E:
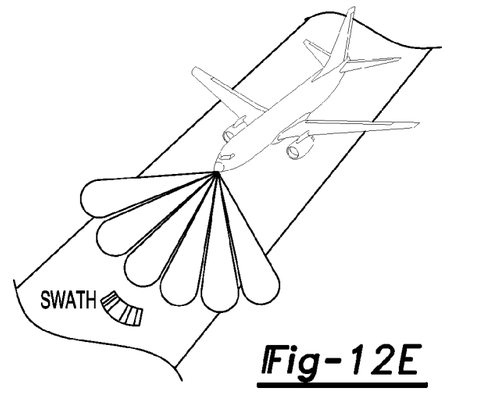

In some embodiments, the frequency scanning antenna comprises a slotted waveguide 18 as illustrated in FIG. 7. The slotted waveguide receives a traveling-wave. The slotted waveguide comprises one of a helical (FIG. 7) and a serpentine (FIGS. 1-3) waveguide feed. In some embodiments, slots 20 of the slotted waveguide 18 are milled from a narrow wall 22 of the slotted waveguide 18, as illustrated in FIG. 8B. However, in some embodiments, slots 20 of the slotted waveguide 18 are milled from a broad wall 24 of the slotted waveguide 18, as illustrated in FIG. 8A. In some embodiments, slots 20 of the slotted waveguide 18 are linearly aligned, as illustrated in FIG. 10B. However, in some embodiments, slots 20 of the slotted waveguide 18 are linearly offset, as illustrated in FIG. 10A. In some embodiments as illustrated in FIG. 11, slots 20 of the slotted waveguide 18 are tapered in width for uniform excitation of the slotted waveguide.

An embodiment may include an Application Specific Integrated Circuit (ASIC), an electronic circuit, a processor (shared, dedicated, or group) and a memory that execute one or more software or firmware programs, a combinational logic circuit, and/or other suitable components that provide the described functionality.

According to the principles of the present disclosure, a 94 GHz pulse-Doppler embodiment of an OFDM frequency scanning radar is presented as illustrated in FIG. 3. Pulse-Doppler and frequency modulated interrupted continuous wave (FMICW) radars allow longer range than a frequency modulated continuous wave (FMCW) radar through usage of half-duplex T/R modules. In addition, a single antenna can be time-shared by the transmitter and receiver.

Frequency scanning antennas, for which the direction of maximum radiation sensitivity scans with frequency, are essential components of a frequency scanning radar. Frequency scanners are passive phased array embodiments, requiring only one T/R module. They do not require phase shifters or additional power combining (dividing) networks.

The drawbacks of frequency scanning are the decreased instantaneous signal bandwidth (inversely related to the range resolution), compared with TTD beam formers and the hardware complexity required to take advantage of monopulse angle tracking techniques. Angle, Doppler and range resolution are coupled by a 3D angle-Doppler-range ambiguity function for a frequency scanner, whereas angle resolution is decoupled from Doppler and range resolution, which are coupled by a 2D Doppler-range ambiguity function for a monopulse-TTD beam former.

However, at 94 GHz there is ample fractional bandwidth to fit a pulse-Doppler radar waveform that provides sufficient range resolution. The availability of excess bandwidth allows the radar band to be divided into subbands (channels) using an OFDM modem. Each subband carries a pulse-Doppler radar waveform for slant range and Doppler frequency shift detection, and corresponds to a certain scanning angle. In addition, all scanning angles are measured simultaneously, providing the radar operator with an adequate refresh rate for the radar image. Note that the prior art of frequency scanning radars employ frequency swept local oscillators to vary the RF frequency and sequentially scan the beam.

OFDM divides the frequency spectrum into subbands small enough to allow for the channel transfer function to be assumed constant within a single subband. A subband radar waveform (echo) is I/Q (de)modulated using, for example, m-ary quadrature amplitude modulation (m-QAM). Fast fading effects, which induce high Doppler spread, disappear as they occur during the transmission of a single symbol. Fast fading induces a high Doppler spread. The coherence time is less than the symbol period. The channel variations are faster than baseband signal variations.

In addition, single-chip CMOS (complementary metal-oxide semiconductor) radios for multiband OFDM (MB-OFDM) can be used as 10 GHz modems. These CMOS radios may be cost-effective half-duplex ultra-wideband modems, and may be based on a 4G OFDM standard, such as WiMAX (IEEE 802.16e). The most recent IEEE 802.16e standard, IEEE 802.16e-2005, is incorporated herein by reference in its entirety.

Figure 16:
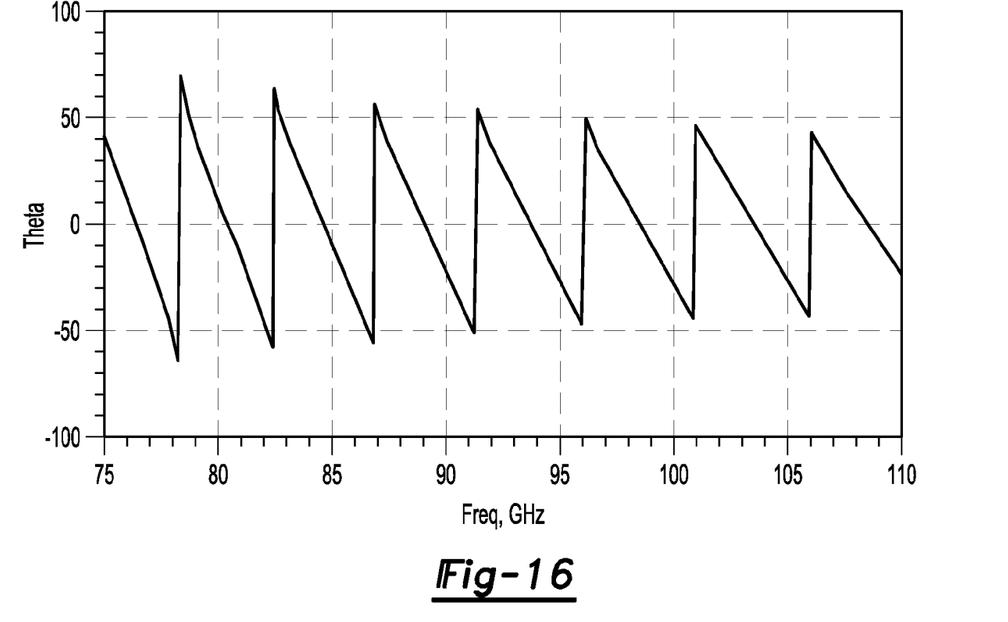
FIG. 16 illustrates predicted frequency scanning for the slotted waveguide embodiment.
Figure 17:
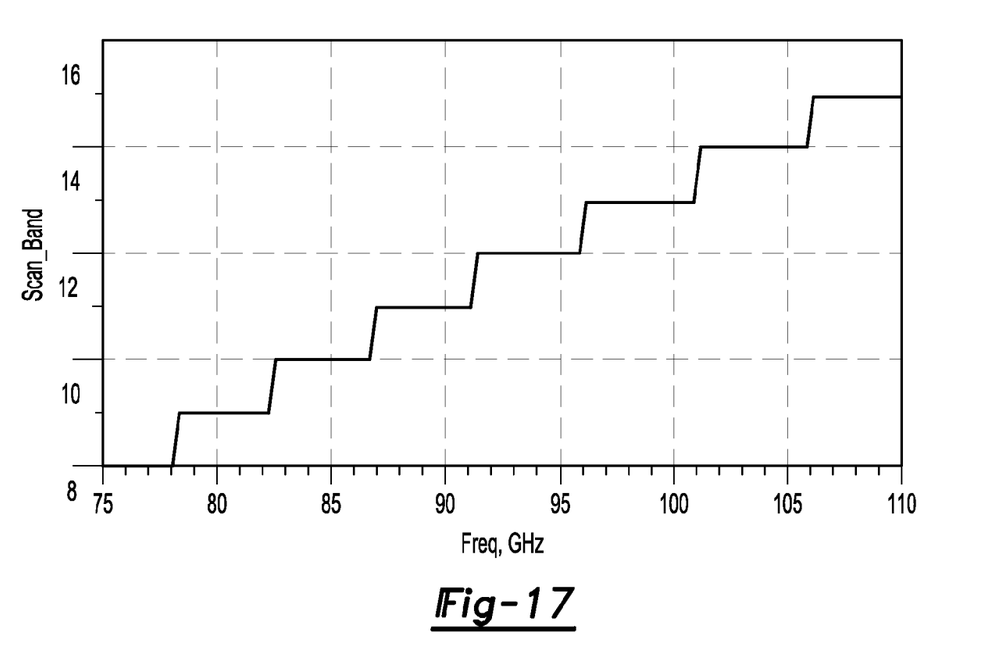
FIG. 17 illustrates the simulated scan band number versus frequency for the slotted waveguide embodiment.
Figure 18:
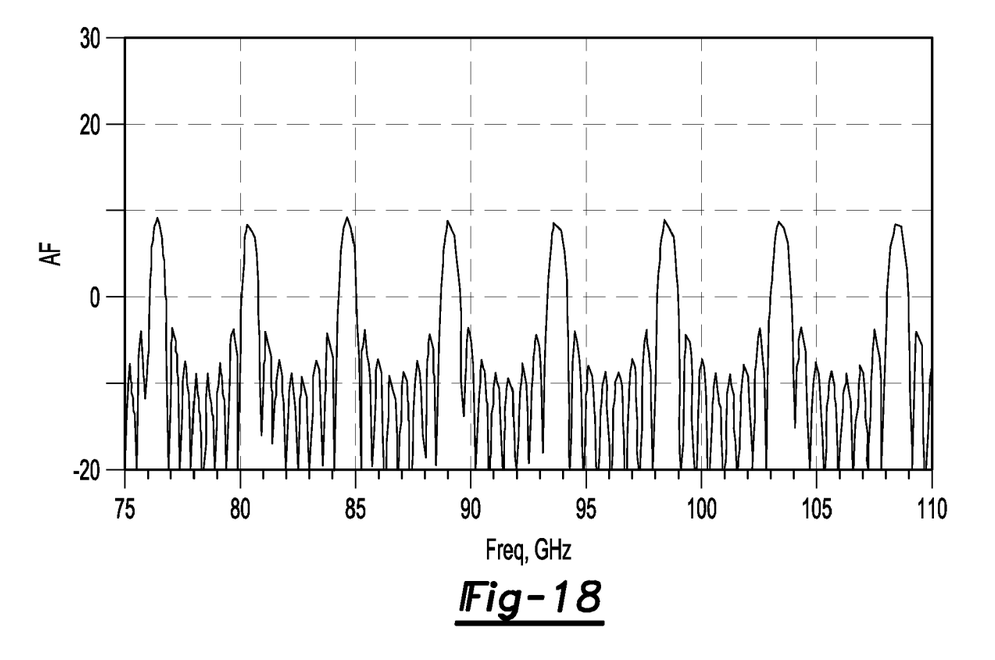
FIG. 18 illustrates the simulated broadside array gain versus frequency.

A plurality of scan bands as illustrated in FIGS. 16, 17, and 18 may be used to overcome the effects of intentional and unintentional RF electronic interference. The effects of interference can be reduced by either operating in a plurality of scan bands simultaneously, by assigning appropriate phase and amplitude weights to the received signals on each scanband; or the effect of interference can be reduced by adaptively changing the operational scan band when interference is detected; or by some combination of the two.

Figure 4:
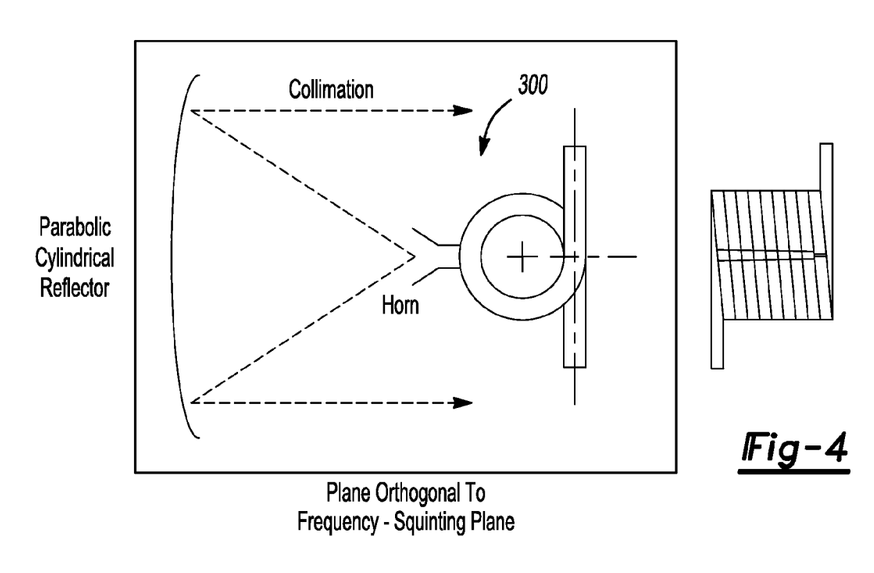
FIG. 4 illustrates a portion of the radar system of FIG. 1 wherein the radiation pattern of the frequency scanning antenna is collimated in a plane orthogonal to the frequency scanning plane.
Figure 6:
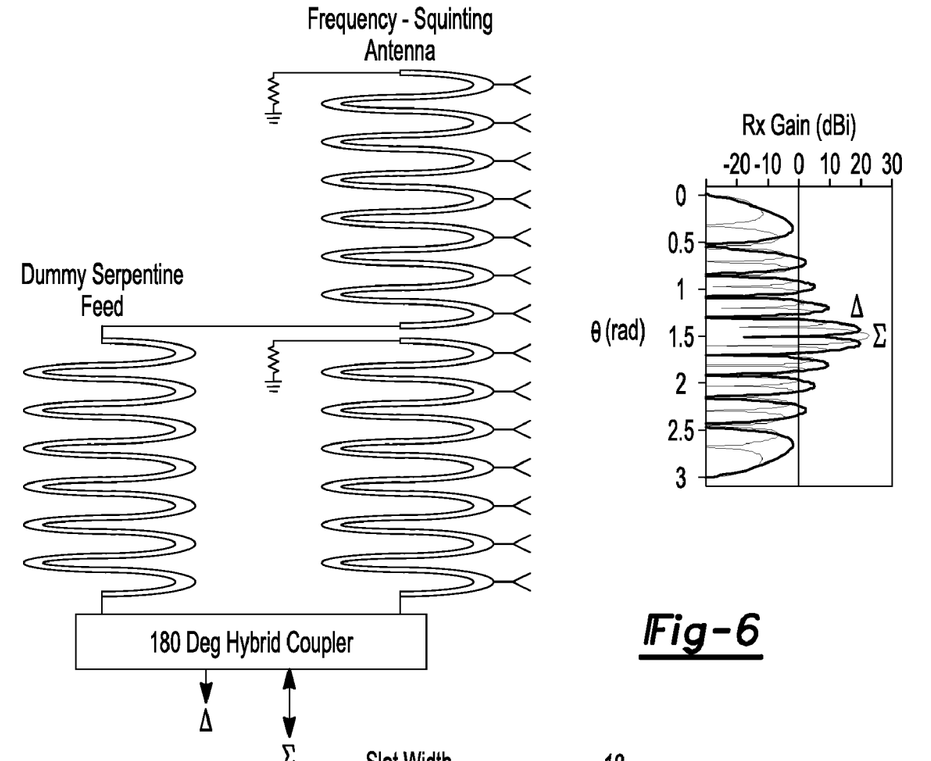
FIG. 6 illustrates a frequency scanning antenna, which is monopulse-fed.

A monopulse feed may be implemented to increase the angular resolution in the frequency-scan plane. An example of a monopulse feed is illustrated in FIG. 6. Means of collimation 300 (for example a horn antenna, a lens, or a reflector), as illustrated in FIG. 4, may be implemented to increase the angular resolution in the plane orthogonal to the frequency-scan plane.

Radar Design

Six equations relate the design specifications of a frequency scanning radar based on a uniformly excited phased array.

The half-power beamwidth $\beta$ in degrees is $\beta = 65\lambda/N\,d$, in which N is the number of array elements and $d/\lambda_0$ is the element spacing, which may be relative to the free-space wavelength at 94 GHz. For N=32 and $d/\lambda=0.72$, $\beta$ is 2.1°. Adjacent subband lobing allows a seven times angular resolution improvement of the ground maps beyond real beam angular resolution to 0.3° in the cross-track.

The relation between range resolution ($r = c\tau/2$, where $\tau=1/BW$ and BW is the subband instantaneous signal bandwidth) and angular resolution (half-power beamwidth $\beta$) is given as $$BW \le \frac{\beta \Delta f}{256 \sin\theta_m}.$$

For further discussion, see E. Brookner, *Practical Phased Array Antenna Systems*, Artech House, 1991, the disclosure of which is incorporated herein by reference in its entirety.

The maximum subband instantaneous signal bandwidth BW is calculated for the impedance bandwidth of the helical feed being $\beta = 2.1°$, f=94 GHz, and $\Delta f$=4 GHz (4.25% of 94 GHz). $\theta_m$ is the maximum scanning angle, which may be equal to 20°. The maximum subband instantaneous signal bandwidth BW used in the frequency scanning radar may be approximately 96.6 MHz, corresponding to a range resolution of 1.55 m.

The directivity of the cross-track (azimuth) of a linear array is:

$$D_a = 4.13 \frac{Nd}{\lambda_0}.$$

The directivity in the along-track (elevation), $D_e$, is assumed to be 10 dBi. The 2-D directivity is related to the product of $D_a$ and $D_e$. Assuming an array efficiency of 100%, the 2-D gain equals the 2-D directivity. $D_e$ may be improved by connecting the helical feed to a continuous transverse stub (CTS) array.

The radar range equation for a chirp-free radar waveform with a pulse-width bandwidth product equal to 1 (It is assumed that no pulse compression is used—i.e. the time bandwidth product is equal to 1, $\tau \times BW=1$) is given by $$R = \sqrt[4]{\frac{\lambda_0^2 EIRP G_r / T\sigma}{64\pi^3 k_B BW\ SNR}},$$

in which EIRP=$G_t P_t$=23.8 MW, assuming an overall 2-D array gain $G_r=G_t=29.7$ dBi and a peak transmit power Pt=25 kW. The target RCS, $\sigma$, is assumed to be 10 dBsm and the SNR is set to 20 dB. $k_B$ is the Boltzmann constant. At room temperature, the range equation yields a maximum range detection up to 4.15 km.

The mean radiated power, $P_m$, which is regulated, is $$P_m = \frac{P_t}{PMEPR} = \frac{P_t PRF}{BW}.$$

A pulse repetition frequency (PRF) of 10 kHz may yield $P_m$=2.58 W per subband. Frequency scanning may be defined as follows:

$$\theta(f) = \arcsin\left(\frac{\lambda(f)}{d}\left(\frac{s}{\lambda_g(f)} - \frac{s}{\lambda_{g0}}\right)\right),$$

$$\text{where } \lambda_g(f) = \frac{\lambda(f)}{\sqrt{1 - \left(\frac{\lambda(f)}{2a}\right)^2}}, \text{ and } \lambda_g(f)$$

is the wavelength of the $TE_{10}$ mode.

Frequency Scanning Antenna

A 94 GHz helical slotted waveguide for OFDM frequency scanning radar has been designed. Waveguides are low loss when compared with printed circuit embodiments, resulting in high antenna gain and good receiver NF. Waveguides may allow the highest available transmit power (>25 kW) through usage of VEDs, such as klystrons and traveling-wave tube (TWT) amplifiers. Waveguides may also have high receiver input IP3. Waveguides may offer high EIRP or power-aperture product and high dynamic range, which results in increased range detection. Waveguides are wideband—i.e., the helical slotted waveguide and the T/R module are WR-10 flanged and no mode conversions are necessary. WR-10 waveguide components, such as circulators, limiters, LNA's, mixers and power amplifiers (TWT) are commercially available, and may therefore be relatively affordable. Waveguides also offer very broad environmental tolerances and shock and corrosion resistance without specialized packaging. Several trade-offs are made in the design of a slotted waveguide. For further discussion, see R. C. Johnson, *Antenna Engineering Handbook*, 3rd Ed. McGraw-Hill, 1993, and Y. T. Lo and S. W. Lee, *The Antenna Handbook—Volume 2: Antenna Theory*, Nostrand Reinhold, 1993, the disclosures of which are incorporated herein by reference in their entirety.

Trade-offs regarding slotted waveguide feeding: Standing-wave fed may imply that the slots are equispaced, at a distance that may not be equal to $\lambda g/2$. Traveling-wave fed may mean that the waveguide is terminated into a matched load. While standing-wave feeding allows for higher efficiency, its resonant impedance bandwidth drastically reduces the ability to scan with frequency and limits the maximum scanning angle. Helical waveguide feeds, as illustrated in FIG. 7, may have a larger impedance bandwidth than serpentine waveguide feeds, but may not be as amenable to a two-dimensional array embodiment. Monopulse feeding can be used to increase the angular resolution in the frequency-scan plane, as illustrated in FIG. 6, but it is omitted as it requires a more complex waveguide.

Trade-offs regarding slot radiator configuration: a choice may be made between broad wall slots and narrow wall slots, as illustrated in FIG. 8. The slots are milled from the narrow wall in order to reduce the element spacing, d, and to allow wide-angle frequency scanning in the E-plane without intrusion of grating lobes in the visible region. Contrary to inclined broad wall slots, narrow wall slots cannot be assumed to be lying in an infinite ground plane, and an analytical model for prediction of radiation characteristics is not available.

Trade-offs regarding material selection: The slotted waveguide is made out of Type 304 stainless steel (also called 18-8 or A2), which is a Chromium-Nickel austenitic alloy. One advantage of Type 304 stainless steel may be that it allows for 0.5 mm thick waveguide walls and hence dense element spacing (d/λ=0.72) with grating lobes entering the visible region when scanning beyond 20° from the boresight above 96 GHz. However, while it yields a wide-angle compact array (7.3 cm) and is easier to bend than a 1 mm thick MIL-DTL-85/3BL copper or coined silver, it also attenuates the $TE_{10}$ mode more (17 dB/m) than copper (2.6 dB/m), yielding lower gain. Galvanization of the slotted waveguide is an option, though it may be expensive.

Figure 13:
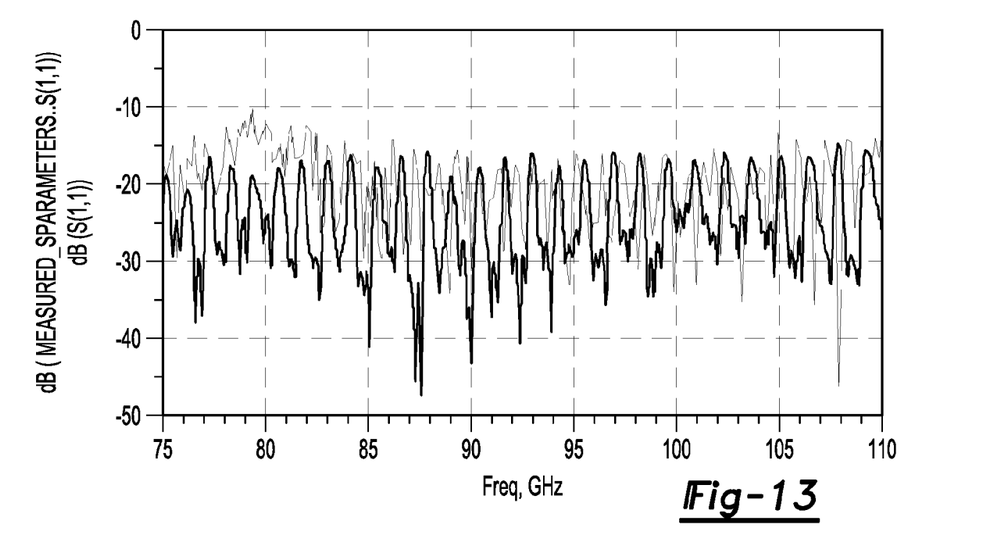
FIG. 13 illustrates the measured and simulated S(1,1) S-parameter versus frequency of the slotted waveguide embodiment.
Figure 14:
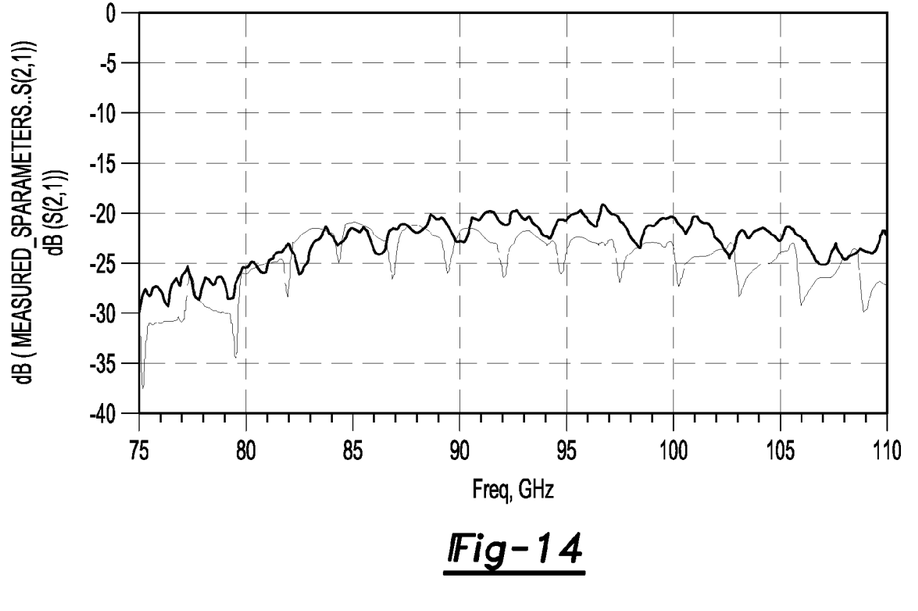
FIG. 14 illustrates the measured and simulated S(2,1) S-parameter versus frequency of the slotted waveguide embodiment.
Figure 15:
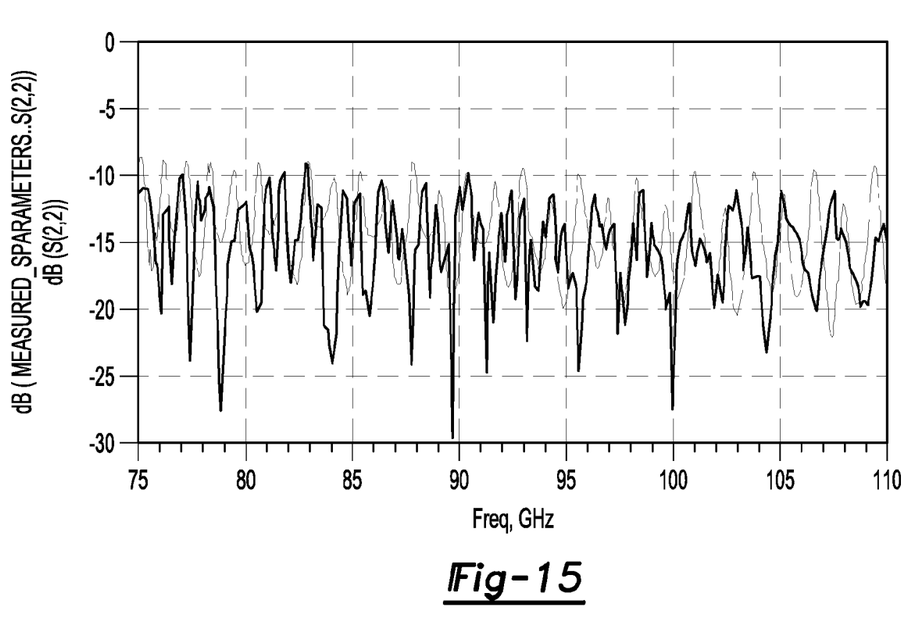
FIG. 15 illustrates the measured and simulated S(2,2) S-parameter versus frequency of the slotted waveguide embodiment.
Figure 19:
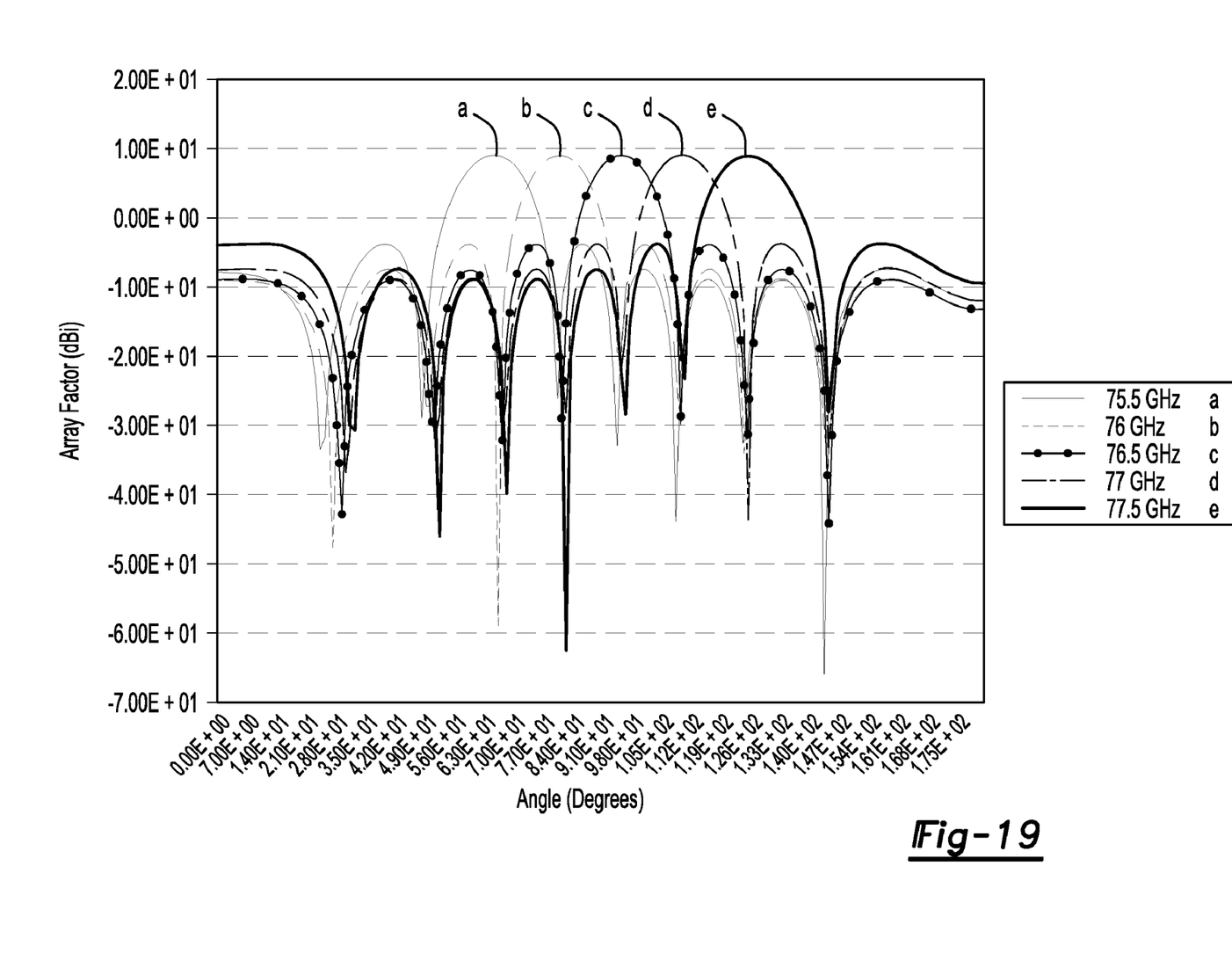
FIG. 19 illustrates the simulated array factor versus angle in the 77 GHz scan band for frequencies 75.5, 76, 76.5, 77, 77.5 GHz, for the slotted waveguide embodiment.
Figure 20:
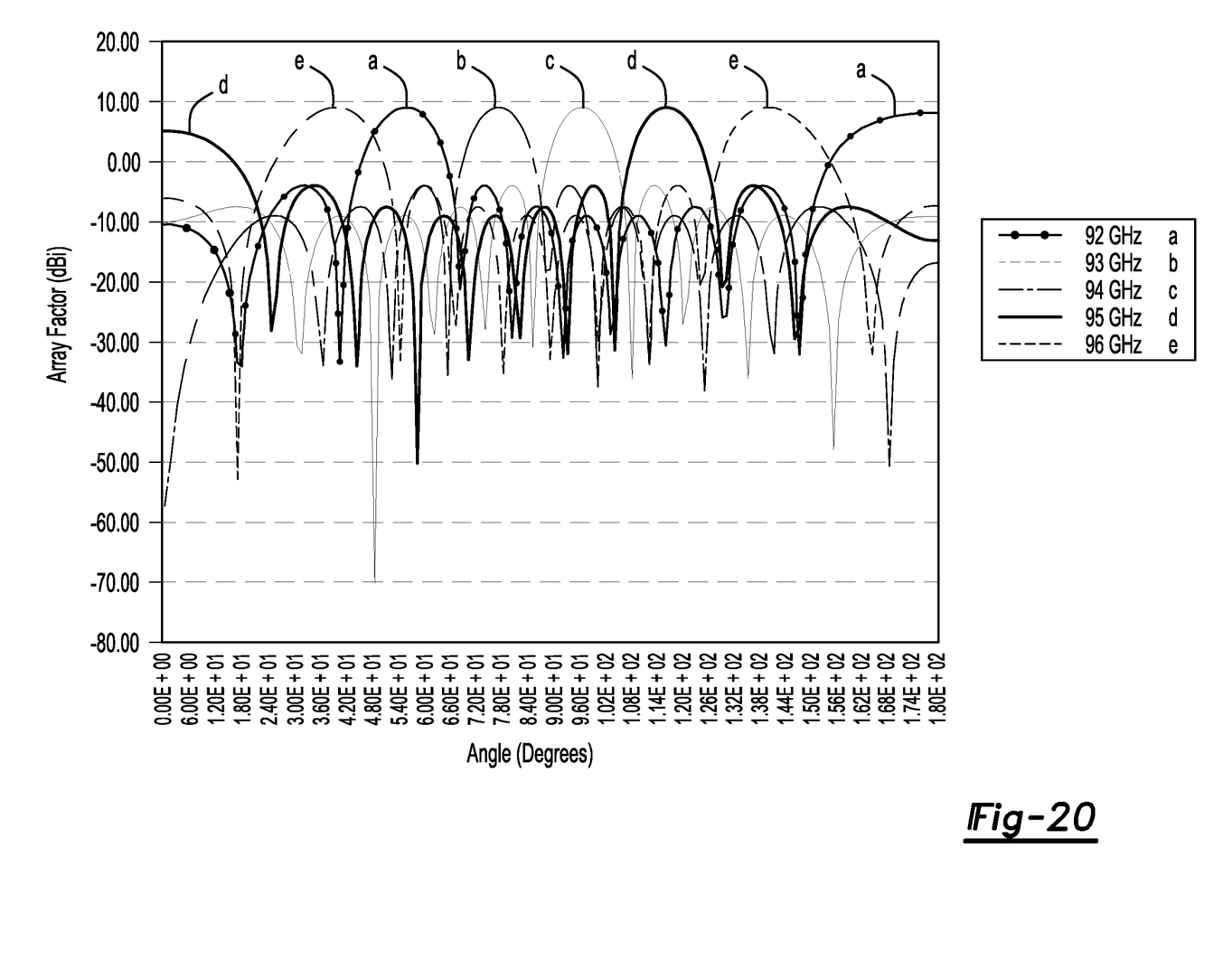
FIG. 20 illustrates the simulated array factor versus angle in the 94 GHz scan band for frequencies 92, 93, 94, 95, 96 GHz, for the slotted waveguide embodiment.
Figure 21:
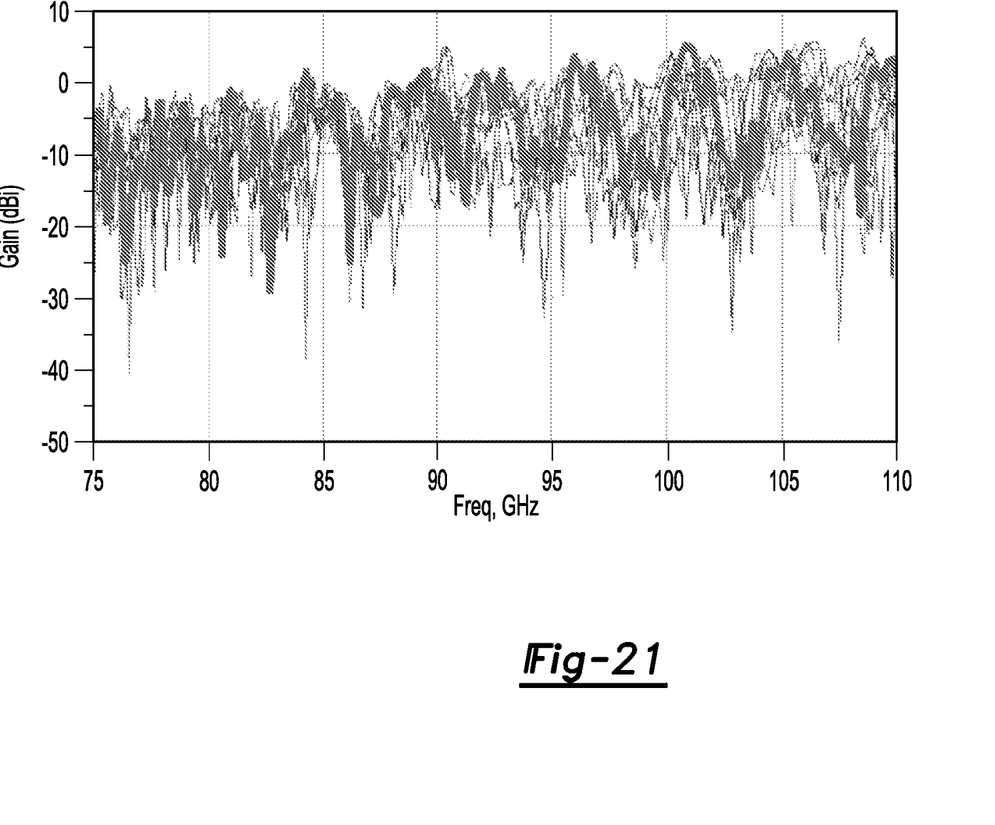
FIG. 21 illustrates the measured gain versus frequency for scanning angles −20, −15, −10, −5, 0, 5, 10, 15, 20 degrees from broadside for the slotted waveguide embodiment.

Measurement results: The slotted waveguide has an impedance bandwidth of 35 GHz (75-110 GHz), as illustrated in FIG. 13, FIG. 14, and FIG. 15, and a radiation pattern bandwidth of 5 GHz, as illustrated in FIG. 16 and FIG. 17. The radiation pattern repeats itself approximately every 5 GHz. Therefore, several scan bands of 5 GHz can be used at once to cover a single point in space with multiple carrier frequencies, belonging to multiple scan bands and multiple OFDM waveforms, as illustrated in FIG. 18. The co-polarized gain is between 0 and 5 dBi, as illustrated in FIG. 21, and the cross-polarized discrimination is −10 dB. The measured maximum scanning angle without occurrence of grating lobes is ±20° from the boresight in the 77 GHz scan band and the 94 GHz scan band, as illustrated in FIG. 19 and FIG. 20.

T/R Module

With particular reference to FIG. 3, transmit/receive (T/R) module 16 can comprise a duplexer 200 being configurable between a first position (illustrated in FIG. 3) for transmitting and a second position for receiving. In a transmit mode, duplexer 200 electrically couples OFDM modem 12 with frequency scanning antenna 14 through a driver 202 and a power amplifier 204. In a receive mode, duplexer 200 electrically couples frequency scanning antenna 14 with OFDM modem 12 through a limiter 206 and a low noise amplifier 208. Finally, a mixer 210 is disposed between duplexer 200 and OFDM modem 12 to up-convert the OFDM modulation or down-convert the RF echo.

A 94 GHz transmit/receive module 16 with 2 GHz bandwidth can be assembled based on commercial off-the-shelf WR-10 waveguide components for short-range indoor concept validation. The design can be optimized for peak transmit power (17.4 dBm) and spurious-free dynamic range at the receiver side (59.16 dB). The receiver has a gain of 8.3 dB, a noise figure (NF) of 6.24 dB, and an input IP3 of −10.65 dBm.

The circulators may have an insertion loss of 1.6 dB and an isolation of 35 dB, and may comprise Quinstar QJY-95023W circulators. The LNA 208 may have a 20 dB gain with a noise figure (NF) of 4.5 dB and P1 dB of −10 dBm at 94 GHz, and may comprise a Quinstar QLN-95024520-00 LNA. The mixer 210 may be a balanced mixer with a conversion loss of 8.5 dB and an IP3 of 3 dBm, and may comprise a Millitech MXP-10-RSSSL balanced mixer.

The PA 204 may have 26 dB of gain over the 91 to 94 GHz frequency range and a P1 dB of 19 dBm, and may comprise a Millitech AMP-10-02190 PA. The transmit/receive module 16 may have at least 4 GHz of bandwidth to accommodate frequency scanning up to ±20° from the boresight. To achieve additional range, a 25 kW pulsed klystron may be used.

OFDM Modem

The OFDM radar waveform may be implemented using an MB-OFDM chipset evaluation board of one of the WiMedia Alliance members. MB-OFDM utilizes 7.5 GHz of unlicensed spectrum from 3.1 to 10.6 GHz allocated by the Federal Communications Commission (FCC) for UWB communication.

APPLICATIONS

The present disclosure can be used in space-borne, automotive, naval, ground-based and airborne applications, as illustrated in FIGS. 12A-E, respectively, including wide-band and narrow-band, wide-angle and narrow-angle, and in high-resolution and low-resolution embodiments. A 94 GHz orthogonal frequency division multiplexing (OFDM) frequency scanning radar according to the principles of the present disclosure can be used for autonomous landing guidance (ALG). The present disclosure also has potential in the automotive market as the radar sensor for forward collision warning systems (FCWS) and autonomous cruise control (ACC), such as 77 GHz long-range ACC.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A radar system comprising:
an orthogonal frequency division multiplexing (OFDM) modem outputting an OFDM modulation; and
a frequency scanning antenna operably coupled with said OFDM modem, said frequency scanning antenna outputting OFDM modulated radio frequency (RF) energy in response to said OFDM modulation, said frequency scanning antenna further receiving said OFDM modulated radio frequency (RF) energy reflected from an object, said OFDM modem demodulating said OFDM modulated radio frequency (RF) energy reflected from the object, directionality of said frequency scanning antenna being determined by a sub-band carrier frequency of said OFDM modulation,
wherein said frequency scanning antenna is a slotted waveguide and wherein dimensions of each of slots of said slotted waveguide are varied to control the array amplitude weights of each of slot radiator elements.

2. The radar system according to claim 1 wherein said slotted waveguide is traveling-wave fed.

3. The radar system according to claim 1 wherein said slotted waveguide is a helical or a serpentine waveguide.

4. The radar system according to claim 1 wherein said slotted waveguide comprises slots disposed in a narrow wall thereof.

5. The radar system according to claim 1 wherein slot radiators of said slotted waveguide are oriented in a transverse, longitudinal or inclined direction.

6. The radar system according to claim 1 wherein slot radiators of said slotted waveguide are linearly aligned.

7. The radar system according to claim 1 wherein said slotted waveguide comprises a slot, dimensions of said slot beginning less than a resonant length.

8. The radar system according to claim 1 further comprising:
a transmit/receive (T/R) module operably disposed between said OFDM modem and said frequency scanning antenna.

9. The radar system according to claim 8 wherein said T/R module up-converts said OFDM modulation in frequency to create an up-converted signal, amplifies the up-converted signal, and outputs said amplified signal to said frequency scanning antenna.

10. The radar system according to claim 8 wherein said T/R module amplifies and down-converts in frequency a received radar return from said frequency scanning antenna to create a down-converted signal and outputs said down-converted signal to said OFDM modem.

11. The radar system according to claim 1 wherein said frequency scanning antenna detects a plurality of distinct operational bandwidths.

12. The radar system according to claim 1 wherein said frequency scanning antenna operably scans a plurality of scanning angles simultaneously.

13. The radar system according to claim 1 wherein said sub-band carrier frequency of said OFDM modulation carries a pulsed radar waveform.

14. The radar system according to claim 1 wherein a radiation pattern of said frequency scanning antenna is collimated in a plane orthogonal to a frequency scanning plane.

15. The radar system according to claim 1 wherein said frequency scanning antenna is monopulse fed.

16. A radar system comprising:
an orthogonal frequency division multiplexing (OFDM) modem outputting an OFDM modulation; and
a frequency scanning antenna operably coupled with said OFDM modem, said frequency scanning antenna outputting OFDM modulated radio frequency (RF) energy in response to said OFDM modulation, said frequency scanning antenna further receiving said OFDM modulated radio frequency (RF) energy reflected from an object, said OFDM modem demodulating said OFDM modulated radio frequency (RF) energy reflected from the object, directionality of said frequency scanning antenna being determined by a sub-band carrier frequency of said OFDM modulation,
wherein said frequency scanning antenna outputs a plurality of frequency-scan bands used to cover colored space with a plurality of OFDM waveforms.

17. The radar system according to claim 16, further comprising:
a colored space radar signal processing system used to decrease vulnerability to electronic countermeasures and jamming.

18. The radar system according to claim 16 wherein said frequency scanning antenna detects a plurality of distinct operational bandwidths.

19. The radar system according to claim 16 wherein said frequency scanning antenna operably scans a plurality of scanning angles simultaneously.

20. The radar system according to claim 16 wherein said sub-band carrier frequency of said OFDM modulation carries a pulsed radar waveform.

* * * * *